Figure 1:
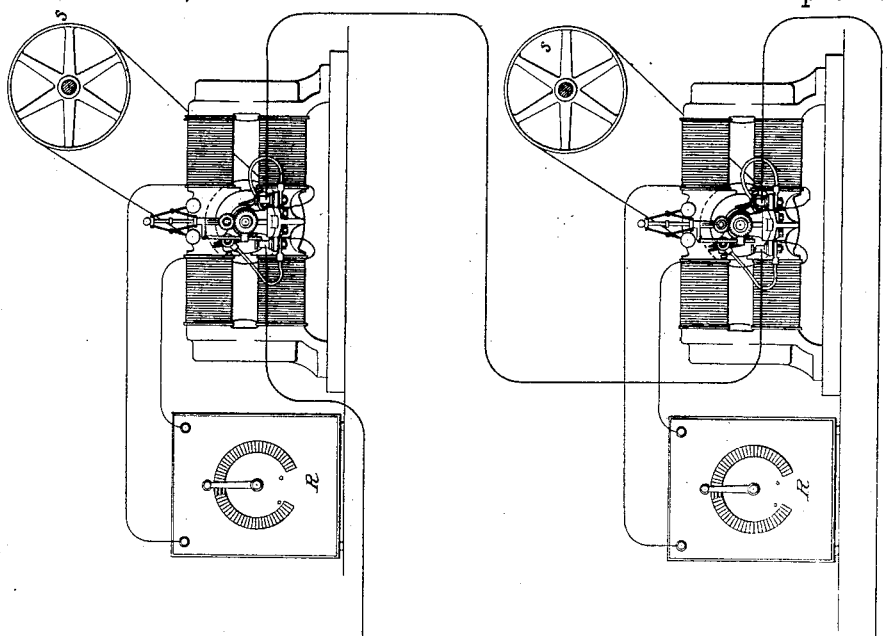
Figure 1:
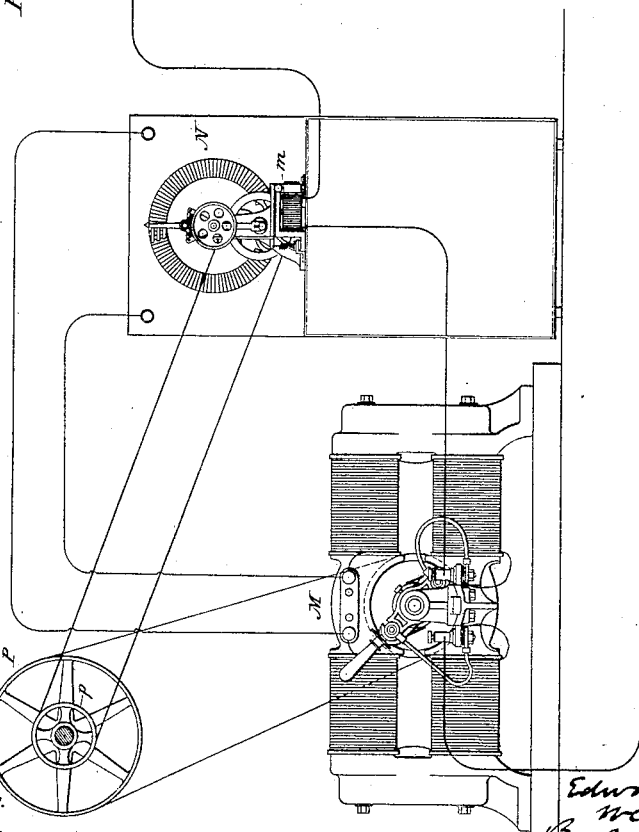

(No Model.) 2 Sheets—Sheet 1.

E. WESTON.
SYSTEM FOR THE TRANSMISSION OF POWER BY ELECTRICITY.

No. 316,090. Patented Apr. 21, 1885.

Attest:
Raymond A. Barnes.
W. Frisby

Inventor:
Edward Weston
By Parker W. Page (No Model.)  2 Sheets—Sheet 2.
E. WESTON.
SYSTEM FOR THE TRANSMISSION OF POWER BY ELECTRICITY.
No. 316,090. Patented Apr. 21, 1885.
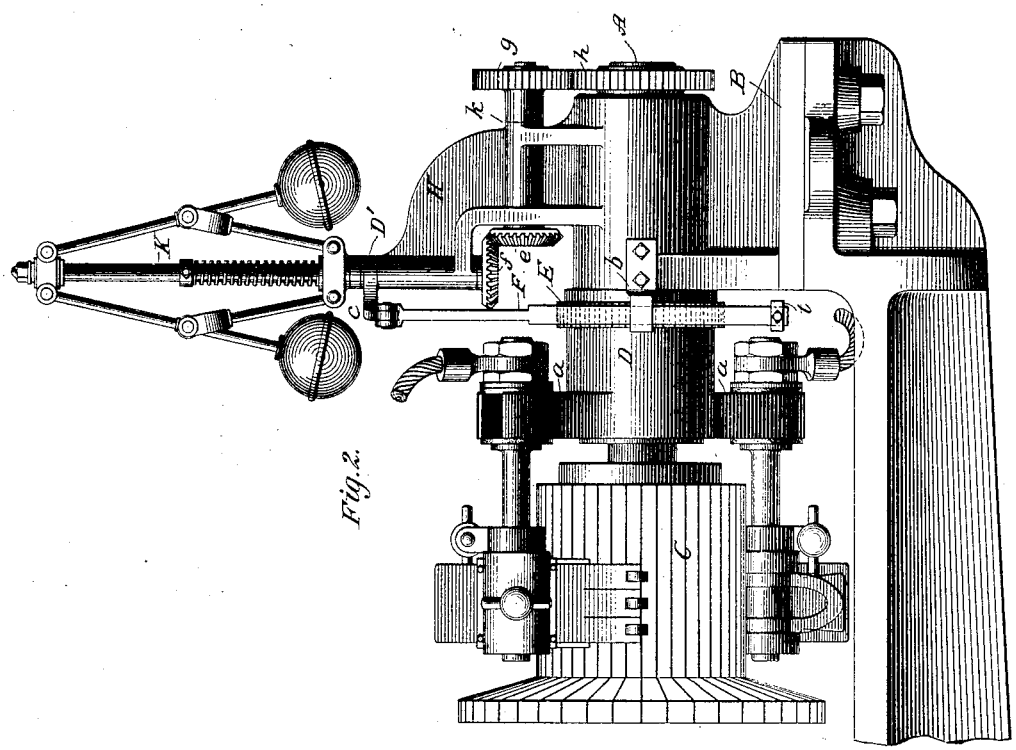
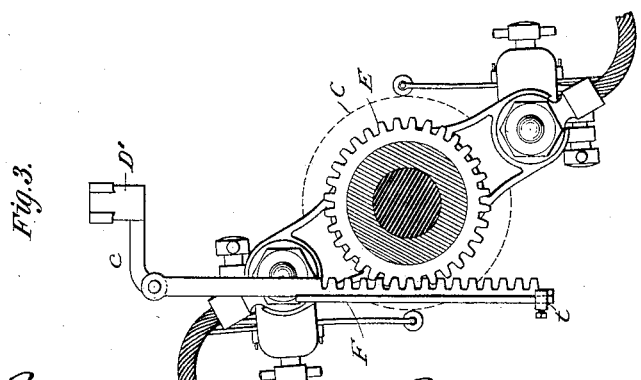
Attest:
Raymond F. Barnes.
W. Frisby
Inventor:
Edward Weston
By Parker W. Page
atty.

United States Patent Office.

EDWARD WESTON, OF NEWARK, NEW JERSEY, ASSIGNOR TO THE UNITED STATES ELECTRIC LIGHTING COMPANY, OF NEW YORK, N. Y.

SYSTEM FOR THE TRANSMISSION OF POWER BY ELECTRICITY.

SPECIFICATION forming part of Letters Patent No. 316,090, dated April 21, 1885.

Application filed May 5, 1884. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Systems for the Transmission and Distribution of Power by Electricity, of which the following is a specification, reference being had to the drawings accompanying and forming a part of the same.

My present invention relates to systems for electrical transmission and distribution of power in which electro-magnetic motors are included in series in a circuit from one or more dynamo or magneto electric generators, and it involves a method of regulation applicable to these systems, the principal objects of which are to maintain a uniform flow of current in the working-circuit, and to provide means for the independent regulation of each motor, by which its speed is kept practically uniform, while the power developed and the electrical energy consumed by the motor are varied to correspond with the load upon it or work to be performed by it. If two or more motors are connected in series in a circuit from a generator, each motor develops a counter electro-motive force acting in opposition to the flow of the current, and the aggregate counter electro-motive force remains constant so long as there is no variation in speed or adjustment of any of the motors. If, however, the speed of any motor be retarded by increasing its load, or accelerated by diminishing its load without changing its adjustment, the variation in its counter electro-motive force increases or diminishes, according to the nature of such variation, the strength of the current flowing. When motors are used under the conditions ordinarily encountered in practice, the work or load of each motor is apt to vary considerably from time to time, and when the motors are connected in series such variations of load not only vary the speed of the individual motor, but, by reacting upon the strength of current throughout the entire circuit, disturb the operation of the other motors. To compensate for the variations of load, and to prevent them from reacting upon or sensibly affecting the speed or action of any of the other motors, whatever may be the direction or extent of the variation, I employ with each motor a device for varying, in proportion to variations in the load, the effect of the magnetic forces that operate to produce the rotation of the armature, and I use with the generator a current-regulator for maintaining, approximately, uniform strength of current in the working-circuit. This not only maintains uniform speed in each motor, but, by reacting upon the counter electro-motive force developed by it, varies the consumption of electrical energy in accordance with the work to be performed, and prevents variations in any one motor from affecting the current supplied to other motors in the same circuit.

In carrying out my invention I prefer to employ a dynamo-electric machine with its field in derived or shunt circuit, and as a regulator therefor an electro-magnet in the main circuit operating upon mechanism that varies the resistance of the field-circuit substantially in the manner described in Patent No. 278,640, granted to me May 29, 1883. With each of the motors which are connected in series in the circuit from the generator I combine a centrifugal governor driven by the motor and a device controlled by the governor for gradually varying, through the working range of the motor, the mutual reaction of the field and armature by which the armature is rotated, and at the same time producing a corresponding variation in the counter electro-motive force developed by the motor. This result may be accomplished by varying the effect of the current upon the field or the armature, or upon both the armature and field of the motor in various ways, which will be well understood by persons familiar with the construction and operation of dynamo-machines and electric motors. The means which I prefer to use for this purpose consists of a device for shifting the position of the brushes upon the commutator, and thereby varying the relations of the armature to the field; and I combine a centrifugal governor with this in such a manner that the brushes will bear as nearly as may be on the theoretical maximum points of the commutator when the motor is at rest, and will be adjusted by the governor when the motor is in operation, so as to bear on different points on the commutator according to the load upon the motor.

With constant strength of current in the working circuit, it is obvious that a motor develops its maximum power with the brushes bearing on the maximum points of the commutator, and no power at all when the brushes bear exactly on the neutral points, and that the motor may be adjusted with great nicety to develop any required amount of power between these limits by proper adjustment of the brushes, since the position of the brushes determines the position of the poles of the armature with reference to the poles of the field, and shifting the brushes varies the magnetic couple tending to rotate the armature. The position of the brushes also determines the counter electro-motive force developed by the motor at a given speed, and, accordingly, the consumption of electrical energy in it. With this system of regulation the power developed by the motor and the electrical energy consumed by it vary approximately in unison, and are both independent of the speed of the motor, which is kept practically constant.

In practice motors are not driven for any considerable part of the time up to their full capacity, and with this system of regulation the brushes will usually bear on points of the commutator intermediate between the maximum and neutral points, so as to have a capacity for adjustment in both directions, and it is preferable to so fix the nominal capacity of the motor that when it is carrying its full nominal load the brushes shall rest a little back of the maximum points, in order that the regulator may have a margin for responding to such slight temporary overloading as is liable to occur in practice. I have illustrated this system in the accompanying drawings, to which I will now refer.

Figure 1 is a diagram illustrating the relative arrangement of the several members of the parts of the system. Fig. 2 is a view in elevation of the commutator of one of the motors and the regulating mechanism that operates in conjunction therewith. Fig. 3 is a sectional detail of certain parts of the regulating mechanism.

Referring to Fig. 2, the letter A designates the armature-shaft of an electro-magnetic motor; B, the stationary support for the bearing, and C the commutator.

On the shaft A, between the bearing and the commutator, is a sleeve, D, turning freely about its bearing, from which extend arms $a$ $a$, carrying the commutator brushes or collectors.

Attached to the sleeve D is a toothed wheel, E, with which meshes a vertical rack, F, supported by a guide, $b$. This is connected to an arm, $c$, extending from the sleeve D' on the vertical spindle K of a centrifugal governor. The spindle is carried by a standard, H, and derives motion from the motor-shaft A through the bevel-gears $e f$, cog-wheels $g h$, and intermediate arbor, $k$. The sleeve D' is connected to the governor-balls G by the ordinary links, and is arranged to be moved up and down by the same on the spindle without being revolved. In its path of downward movement should be interposed a stop to prevent the balls G from entirely collapsing. The support of the standard H may serve this purpose, and the rack F should be so geared with the brush-holding sleeve that when the sleeve D' is in its lowest position the brushes will bear on the maximum points of the commutator. It is obviously important that the brushes should always bear either directly upon or on the same side of these points, as otherwise the motor is liable to be reversed, and to prevent the brushes being carried by the neutral points on the commutator a similar stop is placed in a position to limit the upward movement of the sleeve D' or rack F at the proper point. A convenient place for this stop is on the rack-bar F, the stop being designated by the letter $t$. Two or more motors thus equipped are included in the circuit L of the generator M. With the generator is combined a regulator, which I have shown at N, consisting of a rheostat in the field-circuit controlled by an electro-magnet, $m$, in the main circuit.

The details of the regulator are described in Patent No. 278,640, already referred to.

Any suitable form of electric motor having a rotating armature and commutator may be used, the motor being of course properly designed and constructed with reference to the amount of power to be developed and the strength of current employed. I prefer, however, to use motors constructed in substantially the same manner as the dynamo-machine described in my previous patents, and especially Patents Nos. 209,532, 211,311, 259,618, and 278,641. The coils exciting the field of the motor are in a shunt about the armature. This I prefer, since the shifting of the brushes in that case produces a double reaction upon the power developed by the motor, and less range of movement of the brushes is required. This results from the fact that with the field-coils in derivation the strength of the current exciting the field is dependent upon the counter electro-motive force developed by the armature.

For convenience in stopping and starting the motors I insert in the field-circuit of each motor an adjustable rheostat, R, by means of which the intensity of the field of any motor may be gradually reduced when it is desired to stop the motor, and the motor then short-circuited without any sudden shock to the circuit. When the field of the motor is in the direct circuit, the rheostat should be placed in a shunt cutting out the field-coils and the resistance be gradually diminished, so as to divert the current from the field. The generator and regulator are driven by the pulleys P $p$, and the motors are connected to their work by the pulleys $s$ $s$.

The operation of the regulating devices attached to the motors is as follows: On starting the system into operation each motor attains its normal speed more or less quickly, according to the load it has to carry. Up to a rate of speed nearly equal to that at which it should normally run the brushes are not shifted from the maximum points, for the reason that until that speed is reached the centrifugal force developed is not sufficient to spread the governor-balls farther, they being in a position of rest somewhat raised by the lower stop. The motor, therefore, receives the full effect of the current until its normal working speed is reached, when any further increase of speed, however slight, shifts the brushes away from the maximum points, which has the effect of changing the relations of the poles of the field-magnets and armature, and thus decreasing the mutual magnetic reaction in the motor and lowering the counter electro-motive force until a point of equilibrium is reached, at which the power developed is just sufficient to turn the armature at normal speed with the load which the motor is carrying at the time. With any increase or decrease of the load the governor shifts the brushes in the proper direction until a new position of equilibrium is reached, at which the power corresponds to the load. The less the load upon the motor the farther from the maximum points of the commutator will the brushes be, and the less will be the effect upon the motor of the current passing through it, and the less the consumption of electrical energy. As the brushes recede from the maximum points of the commutator and the counter electro-motive force falls less current is diverted through the field-coils, and this still further reduces the power developed. If the load be wholly removed from the motor, the brushes will be carried so near the neutral points that only sufficient power is developed to overcome the friction of the bearings. As the power may be varied in this way by almost insensible gradations throughout the working range of the motor, it is always possible for the brushes to assume and maintain a position in which the power developed is equal to any load the motor is capable of carrying, and all vibrations and abrupt transitions are avoided.

With an ordinary governor, applied to shift the brushes in the manner described, it is obvious that the speed of the motor will be affected somewhat by the load; but as it is practicable to obtain a considerable range of movement of the brushes from slight variations in the speed of the governor, the variations from normal speed are in practice very slight, and the regulation is sufficiently exact for ordinary uses. This variation may be still further reduced by interposing levers between the governor and the brushes, so as to amplify the movement of the brushes, and where very uniform motion is required the brushes may be moved in one direction or the other by independent mechanism, and the governor be used only to control the direction and extent of the movement—as, for instance, the brushes may be moved by a system of ratchets and pawls similar to that described in my Patent No. 278,640, already referred to, and the engagement of the pawls be controlled by the governor instead of by an electro-magnet, as shown in said patent.

It is essential for the proper operation of the system that some form of current-regulator be used with the generator to vary the electro-motive force developed by it, so as to maintain the strength of current approximately constant, or at least to prevent wide variations in the strength of the current, notwithstanding considerable variations in the aggregate counter electro-motive force developed by the motors; but the precise form of current-regulator employed is not material so long as proper regulation is secured.

I have shown the device controlled by the governor as operating to shift the commutator-brushes, and I prefer this method of regulation, as it is simple and efficient, and the motor responds quickly to the governor; but my invention is not limited to the specific devices shown, since the magnetic couple tending to rotate the armature and the counter electro-motive force developed by the motor may be varied in other ways. It is essential, however, for the purposes of my invention that any device which is used for this purpose should have a capacity for gradually varying the magnetic couple tending to rotate the armature throughout the working range of the motor, in order that such device may be adjusted by the speed of the motor and remain at equilibrium at any point determined by the load for the time being upon the motor. It is also obvious that the form of the governor employed is not essential so long as its action depends on the speed of the motor.

I do not claim herein the means for stopping the motor by gradually reducing the intensity of its field, as I have made this the subject of another application; nor do I claim the specific method of governing the motors which involves the variation of the intensity of the field, as this is the invention of William L. Stevens, and has been described by him in an application filed July 3, 1884, No. 136,713; but, without confining myself to the specific details of construction and arrangement of mechanism for operating in the manner specified, What I now claim as my invention is—

1. The combination, with an electric circuit, a generator, and two or more motors connected in series therein, of a regulator for maintaining an approximately uniform strength of current and automatic controlling mechanism connected with each motor and operated by variations in the speed of rotation of the same to gradually vary the effect or relations of the magnetic forces acting to produce their rotation, substantially as herein set forth.

2. The combination, with an electric circuit, a generator, and two or more motors included in series therein, of a current-regulator connected with the generator, automatic controlling mechanism for each motor, and means, as described, operated or controlled thereby for shifting the position of the commutator-brushes of each motor in accordance with variations in its load or work to be performed.

3. The combination, with an electric circuit of a generator and two or more motors included in series therein, of a current-regulator, centrifugal governors driven by the motors, and means for shifting the commutator-brushes of the motors connected with and operated by the governors, as set forth.

4. In a system of electrical distribution, the combination, with a circuit, a generator, and two or more derived or shunt field-circuit motors included therein, of a current-regulator, centrifugal governors driven by the motors, and means for shifting the commutator-brushes of the motors connected with and operated by the governors, as set forth.

5. The combination of a motor, a centrifugal governor driven by the motor, mechanism controlled by the governor for shifting the commutator-brushes, and a stop to prevent the governor from carrying the brushes by the maximum points, substantially as described.

6. The combination of a motor, a centrifugal governor driven by the motor, mechanism controlled by the governor for shifting the commutator-brushes, and a stop for preventing the governor from carrying the brushes by the neutral points, substantially as described.

In testimony whereof I have hereunto set my hand this 3d day of May, 1884.

EDWARD WESTON.

Witnesses:
   W. FRISBY,
   H. D. HARTLEY.